(12) United States Patent
Uekawa (10) Patent No.: US 7,645,077 B2
(45) Date of Patent: Jan. 12, 2010

(54) BI-DIRECTIONAL OPTICAL COMMUNICATION MODULE

(75) Inventor: Masahiro Uekawa, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 12/370,726

(22) Filed: Feb. 13, 2009

(65) Prior Publication Data

US 2009/0208172 A1 Aug. 20, 2009

(30) Foreign Application Priority Data

Feb. 14, 2008 (JP) .............................. 2008-033385

(51) Int. Cl.
*G02B 6/26* (2006.01)
*G02B 6/36* (2006.01)
*H04B 10/00* (2006.01)

(52) U.S. Cl. .......................... 385/92; 385/39; 398/138; 398/139

(58) Field of Classification Search ................... 385/39, 385/44, 92; 398/138–139
See application file for complete search history.

(56) References Cited

U.S. PATENT DOCUMENTS 7,413,355 B2 * 8/2008 Nishizawa et al. ............ 385/93

FOREIGN PATENT DOCUMENTS

JP 2006-154535 6/2006

OTHER PUBLICATIONS

Masahiro Ogusu et al., "Receptacle Type Bi-direction WDM Module I", Toshiba R&D Center, p. 208.

* cited by examiner

*Primary Examiner*—Frank G Font
*Assistant Examiner*—Michael P Mooney
(74) *Attorney, Agent, or Firm*—Volentine & Whitt, PLLC (57) ABSTRACT

An optical communication module includes a base substrate; a wavelength branching filter arranged on the base substrate, in which a light is allowed to go through or be reflected according to a wavelength thereof; a photodetector arranged on the base substrate to receive a light passed through the wavelength branching filter and to convert the light into an electric signal; and a light emitting device arranged on the base substrate to provide a transmission light. The transmission light is outputted through the wavelength branching filter. The optical detector comprises a light receiving portion which is formed to have a first length and a second length, which is shorter than the first length. The first length of the light receiving portion is perpendicular to an optical axis of an input light on a plane parallel to a surface of the substrate, and a second length of the light receiving portion is parallel to the optical axis of the input light.

5 Claims, 7 Drawing Sheets

FIG. 7B

BI-DIRECTIONAL OPTICAL COMMUNICATION MODULE

CROSS REFERENCE TO RELATED APPLICATION

This application claims the priority of Application No. 2008-033385, filed Feb. 14, 2008 in Japan, the subject matter of which is incorporated herein by reference.

TECHNICAL FIELD OF THE INVENTION

The present invention relates to an optical communication module used as a communication device. The present invention relates in particular to the optical communication module, in which optical elements for transmission and reception are mounted as a whole on a substrate using a surface mounting method.

In an optical communication network represented by Fiber To The Home (FTTH), a bi-directional optical communication system has become widely used. The bi-directional optical communication system connects a communication office with a user through a single optical fiber and bi-directionally communicates using two kinds of light with different wavelengths as a transmission signal and a reception signal, respectively.

According to such a bi-directional communication, for example, an optical signal having a wavelength of Y1 is transmitted from an end A of an optical fiber, while another optical signal having a wavelength of Y2, which is different from Y1, is transmitted from the other end B of the same optical fiber. An optical signal having the wavelength Y1 transmitted from end A is received at end B, while an optical signal having the wavelength Y2 transmitted from end B is received at end A. Since optical signals having different wavelengths Y1 and Y2 are transmitted in the same optical fiber in the opposite directions, the optical fiber is provided at the ends with wavelength branching filters.

According to the above described method, a wavelength branching filter is coupled to one end (A) of an optical fiber, so that a laser diode (LD) and a photo diode (PD) are optically coupled to the wavelength branching filter. In the same manner, a wavelength branching filter is coupled to the other end (B) of the optical fiber, so that a laser diode (LD) and a photo diode (PD) are optically coupled to the wavelength branching filter. A light having a wave length Y1 outputted from a LD is branched by the wavelength branching filter and transmitted to a PD. In the same manner, a light having a wave length Y2 outputted from a LD is branched by the wavelength branching filter and transmitted to a PD.

Since the above described optical communication module may be for household use and in-office use, it is required to provide such an optical communication module with a lower cost and small in size.

Figure 1:
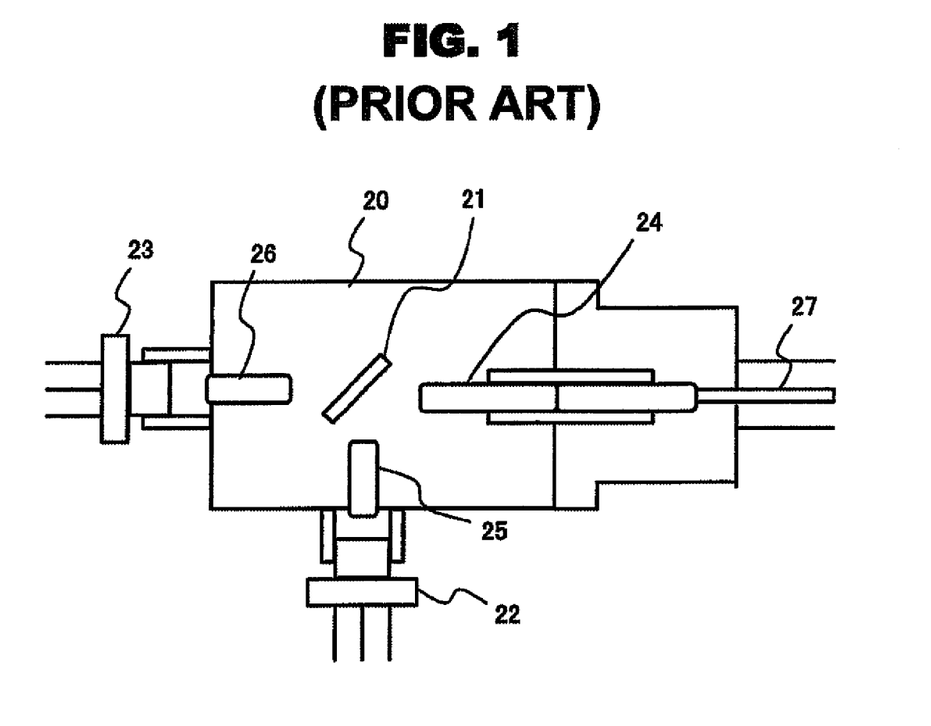
FIG. 1 is a schematic diagram illustrating an outline of a general bi-directional optical communication module.

FIG. 1 shows a conventional bi-directional optical communication module (see non-patent related publication 1). The optical communication module includes a housing 20 of rectangular solid and a wavelength filter 21, arranged in the housing 20. The wavelength filter 21 is capable to branch a light according to its wavelength. An optical fiber 27, a LD 22 and a PD 23 are coupled to an outer wall of the housing 20. Also, the optical fiber 27, LD 22 and PD 23 are coupled to lenses 24, 25 and 26, respectively.

An optical signal having a wavelength of Y1 transmitted from the LD is converted into a parallel beam by the lens 25 and is reflected 90 degrees by the wavelength filter 21. After that, the light (beam) is focused to an optical fiber by the lens 24, and then, is transmitted. On the other hand, an optical signal having a wavelength of Y2 transmitted through the optical fiber 27 is converted into a parallel beam by the lens 24 and passes through the wavelength filter 21. After that, the light (beam) is focused to the PD 23 by the lens 26.

<Non-Patent Publication 1>

"Receptacle type of bi-directional wavelength multiplex optical module", Shoudai Kokusunoki and other two, 1996 Electro Information Communication Society, Electronics Society Convention, C-208, p 208

JP2006-154535A discloses a small size of bi-directional optical communication module, in which a LD and a PD are mounted on the same substrate using silicon micro-lenses.

<Patent Publication 1>

JP2006-154535A

Figure 2:
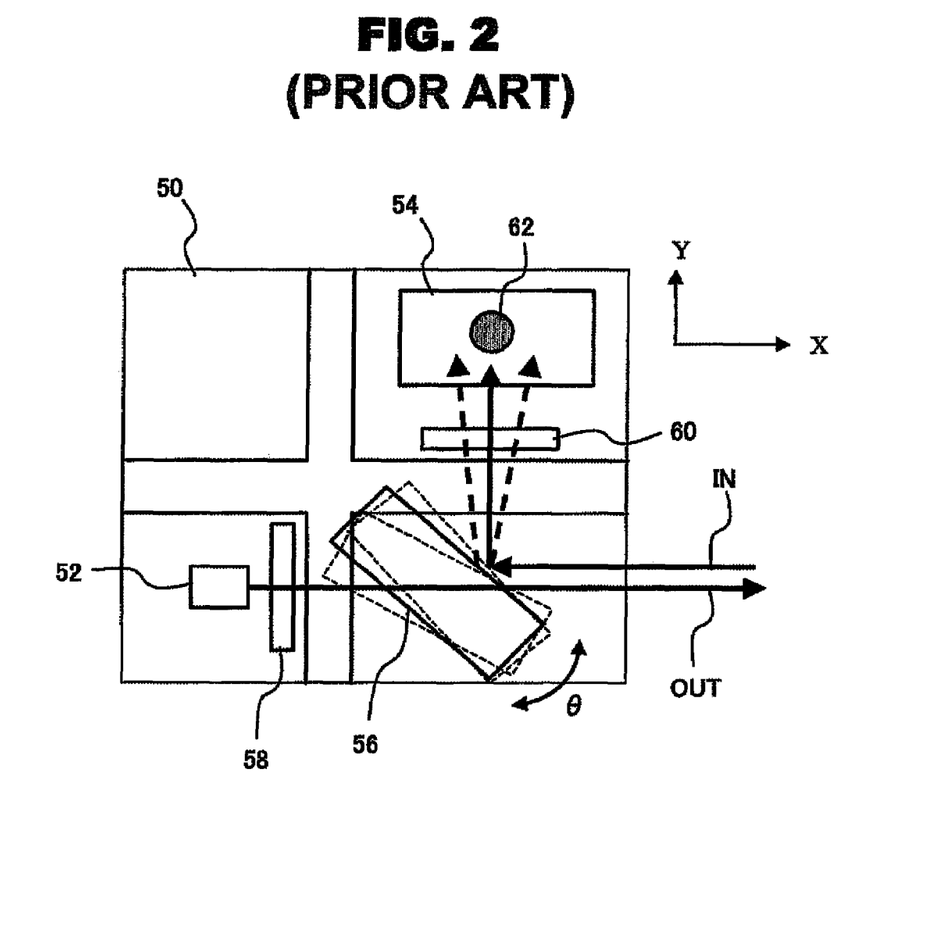
FIG. 2 is a schematic diagram illustrating a conventional bi-directional optical communication module, disclosed in JP2006-154535A.

FIG. 2 shows an optical communication module according to JP2006-154535A. According to the optical module, an output light "OUT" generated by a LD 52, mounted on a substrate 50, is transmitted through a silicon lens and a WDM filter (wavelength branching device) 56 to an optical fiber (not shown). On the other hand, an input light "IN" transmitted through the optical fiber is reflected at the WDM filter 56 and is focused to a receiving portion 62 of a PD 54 by a silicon lens 60.

According to the above described conventional optical communication module, the WDM filter 56 is required to be located at a high accuracy. Mounting accuracy in a rotational direction (θ) of the WDM filter 56 is difficult but very important. If mounting accuracy in a rotational direction (θ) is low, the input light IN to be focused to the PD 54 would be varied in a X-axis direction, as shown in FIG. 2. As a result, a part of the input light IN reaches out of the receiving portion 62 of the PD 54, and therefore; light reception efficiency of the PD 54 would be deteriorated.

Here, "accuracy in a rotational direction" may be called "accuracy on a plane surface of the substrate".

It is possible to avoid deterioration of light reception efficiency of the PD 54 by enlarging a receiving area of the receiving portion 62. However, if a receiving area is enlarged, a capacity of the PD 54 would be increased, and therefore, technical specification (requirements or regulations) including minimum reception sensitivity and maximum capacitance would be out of acceptable range. On the other hand, variation (irregularity) of the input light IN in a Y direction can be easily adjusted at a high accuracy, for example lower than 10 um. That is because, a bottom surface of a WDM filter, to be in contact with a flat surface of the semiconductor substrate 50, is shaped very flat.

OBJECTS OF THE INVENTION

It is an object of the present invention to provide an optical communication module, in which light receiving efficiency of a PD can be improved without deterioration of a receiving sensitivity of the PD.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, an optical communication module includes a base substrate; a wavelength branching filter arranged on the base substrate, in which a light is allowed to go through or be reflected according to a wavelength thereof; a photodetector arranged on the base substrate to receive a light passed through the wavelength branching filter and to convert the light into an electric signal; and a light emitting device arranged on the base substrate to provide a transmission light. The transmission light is outputted through the wavelength branching filter. The optical detector comprises a light receiving portion which is formed to have a first length and a second length, which is shorter than the first length. The first length of the light receiving portion is perpendicular to an optical axis of an input light on a plane parallel to a surface of the substrate, and a second length of the light receiving portion is parallel to the optical axis of the input light.

Here, it is important to control a planar shape of the light receiving portion of the optical detector without change of the area of the light receiving portion. According to the present invention, it is not necessary to incline a photo detector to control a projected area of a light receiving portion.

According to the present invention, a tolerance of mounting accuracy of a wavelength branching filter in a rotational direction becomes larger. As a result, a production yield of an optical module is increased. Further, a PD chip for high frequency can be fabricated without deterioration of mounting tolerance, which has trade-off relation to a light receiving area of a PD.

DESCRIPTION OF REFERENCE NUMERALS

100, 200: Bi-Directional Optical Communication Module
110: Silicon Substrate
120: LD
130, 230: PD
134: Light Receiving Portion
150: Wavelength Branching Filter (WDM Filter)

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

In the following description, same or corresponding elements are represented by the same reference numerals and the same description is not repeated to avoid redundancy.

First Preferred Embodiment

Figure 3:
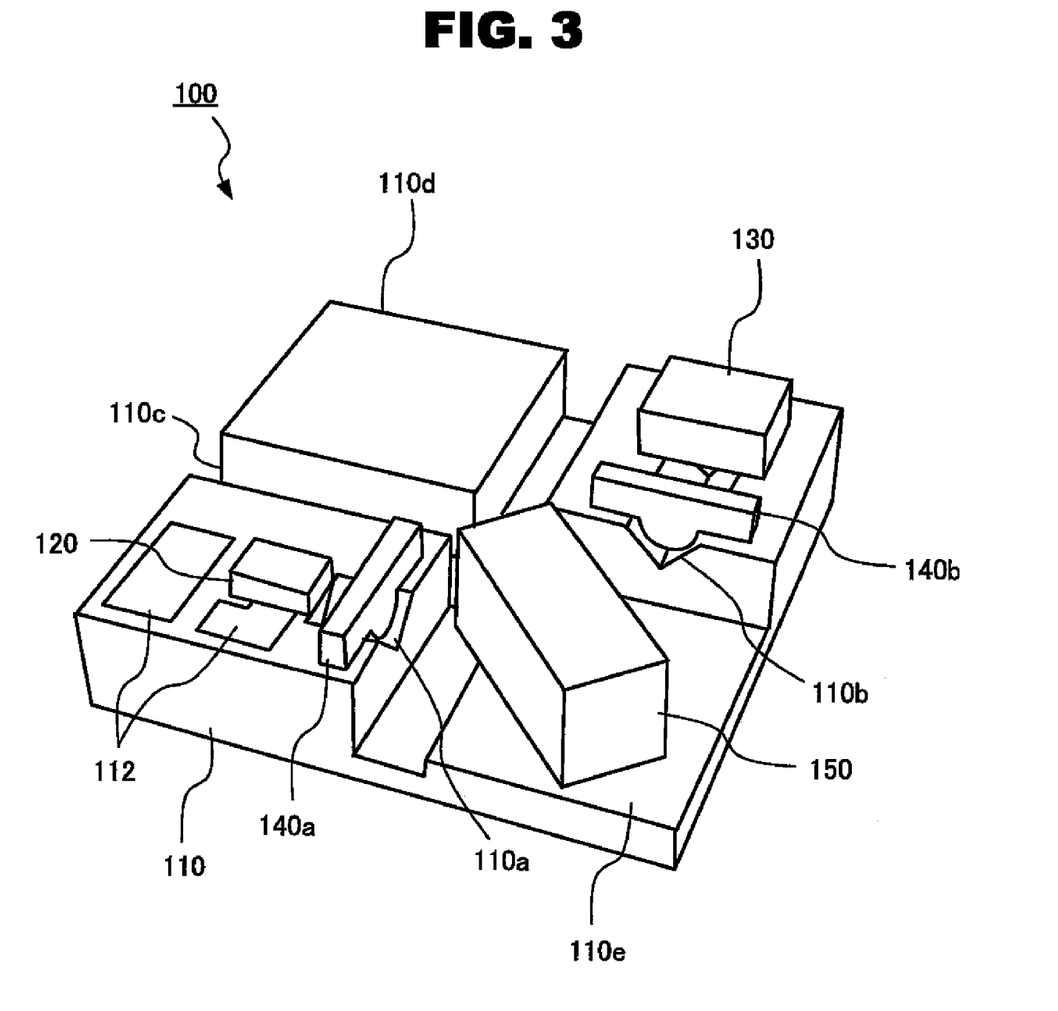
FIG. 3 is a perspective view illustrating a bi-directional optical communication module according to a first preferred embodiment of the present invention.
Figure 4:
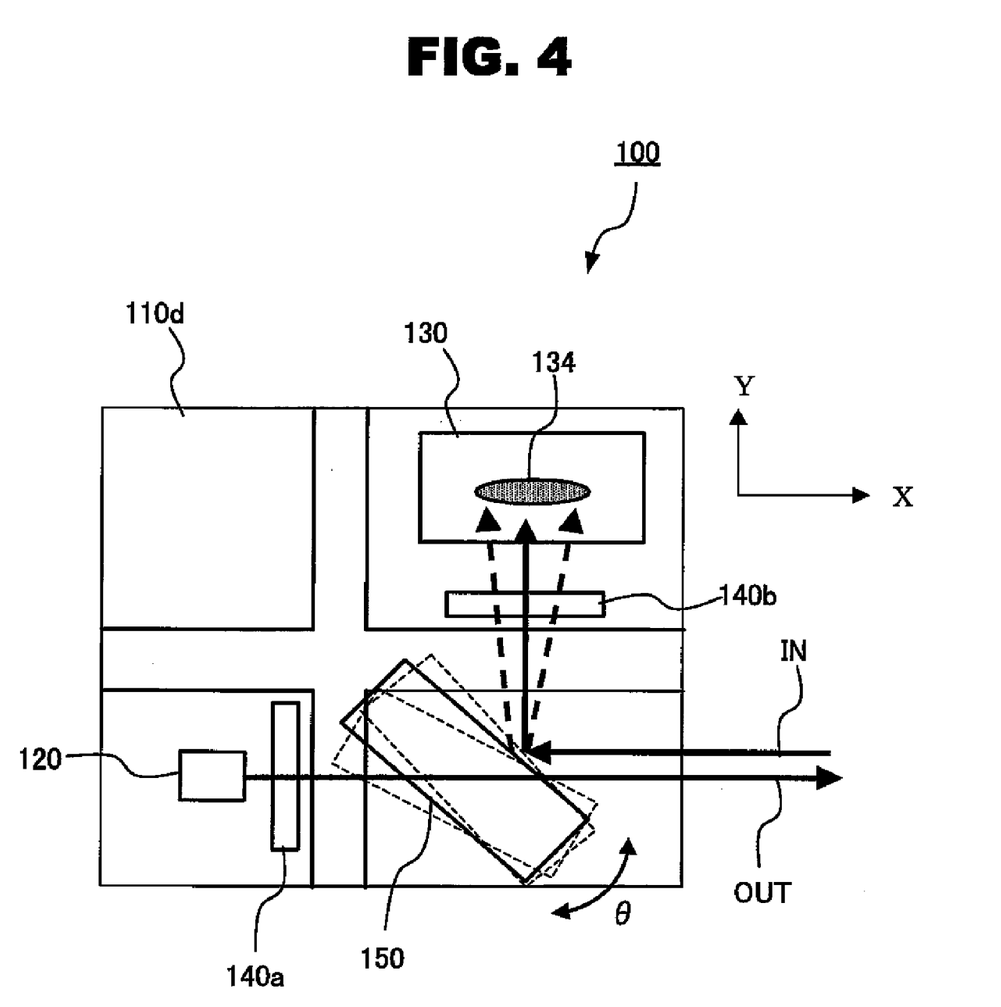
FIG. 4 is a plane view illustrating a bi-directional optical communication module shown in FIG. 3.

FIG. 3 is a perspective view illustrating a bi-directional optical communication module according to a first preferred embodiment of the present invention. FIG. 4 is a plane view illustrating a bi-directional optical communication module shown in FIG. 3.

An optical module 100 according to the present embodiment, a substrate 110 having V-shaped grooves 110a and 110b is prepared. On the substrate 110, a laser diode (LD) 120 functioning as a light emitting device, a photodiode (PD) 130 functioning as a light receiving device, lens elements 140a and 140b, and a wavelength branching filter (WDM filter) 150 are mounted.

The substrate 110 may be of a silicon substrate. The V-shaped grooves 110a and 110b have a cross-section of V-shape. The substrate 110 is also provided with a rectangle groove 110c. The substrate 110 includes a non-mounting region 110d, and a stepped region 110e on which the wavelength branching filter 150 is mounted. Electrode pads 112 are formed on the substrate 110.

The V-shaped grooves 110a and 110b are formed by etching the substrate 110 so that inclined surfaces of the grooves correspond to (111) surface (phase) of silicon. The V-shaped groove 110a is located at a region (and) for the LD 120, while the V-shaped groove 110b is located at a region (land) for the PD 130. The V-shaped grooves 110a and 110b are formed (oriented) to extend in directions perpendicular to each other.

The wavelength branching filter 150 is arranged on a low-level (low floor) portion of the substrate 110. According to the present embodiment, a plate shape of WDM filter is employed as the wavelength branching filter 150. The wavelength branching filter 150 allows a light to pass through or to be reflected. According to the present embodiment, an output light having a wave length, for example of 1.3 um, supplied from the LD 120 passes through the wavelength branching filter 150, while an input light having a wave length, for example of 1.55 um, is reflected by 90 degrees at the wavelength branching filter 150 to guide the light to the PD 130.

According to the present embodiment, silicon-made micro-lenses are used as the lens elements 140a and 140b. Each of the lens elements 140a and 140b has a lens region on one surface. A diffraction optical element, having a diameter of 110 um, is formed on the lens region so that an input light can be curved easily by controlling a mask pattern of the lens region. Each of the lens elements 140a and 140b has a circular-shaped lower edge, which is to be fit in the V-shaped groove 110a or 110b. Such a circular shaped lower edge may have a diameter of about 125 um.

The lens elements 140a and 140b may include lens regions of diffraction optical elements having a diameter of 50 to 250 um. In this case, the V-shaped grooves 110a and 110b would be modified in shaped or form according to the shapes of the lens elements 140a and 140b.

The lens region of the lens element 140a functions as a collimator lens, which converts a light supplied from LD 120 into a parallel beam to be supplied to the wavelength branching filter 150. On the other hand, the lens region of the lens element 140b functions as a condenser lens, which focuses (condenses) a light branched by the wavelength branching filter 150 to the PD 130.

The LD 120 is shaped to be a rectangular solid having a thickness of about 150 um. The LD 120 is arranged adjacent the V-shaped groove 110a. A light generated by the LD 120 is transmitted through the lens element 140a and wavelength branching filter 150.

The PD 130 is a light receiving element and is shaped to be a rectangular solid having a thickness of about 150 um. The PD 130 is arranged adjacent the V-shaped groove 110b to receive an input light transmitted via the wavelength branching filter 150 and lens element 140b. The PD 130 may be made of InGaAs or Ge (germanium) by a conventional process, which has been widely used. For example, the PD 130 may be of a PIN photodiode having an InGaAs layer formed on a InP substrate.

Figure 5A:
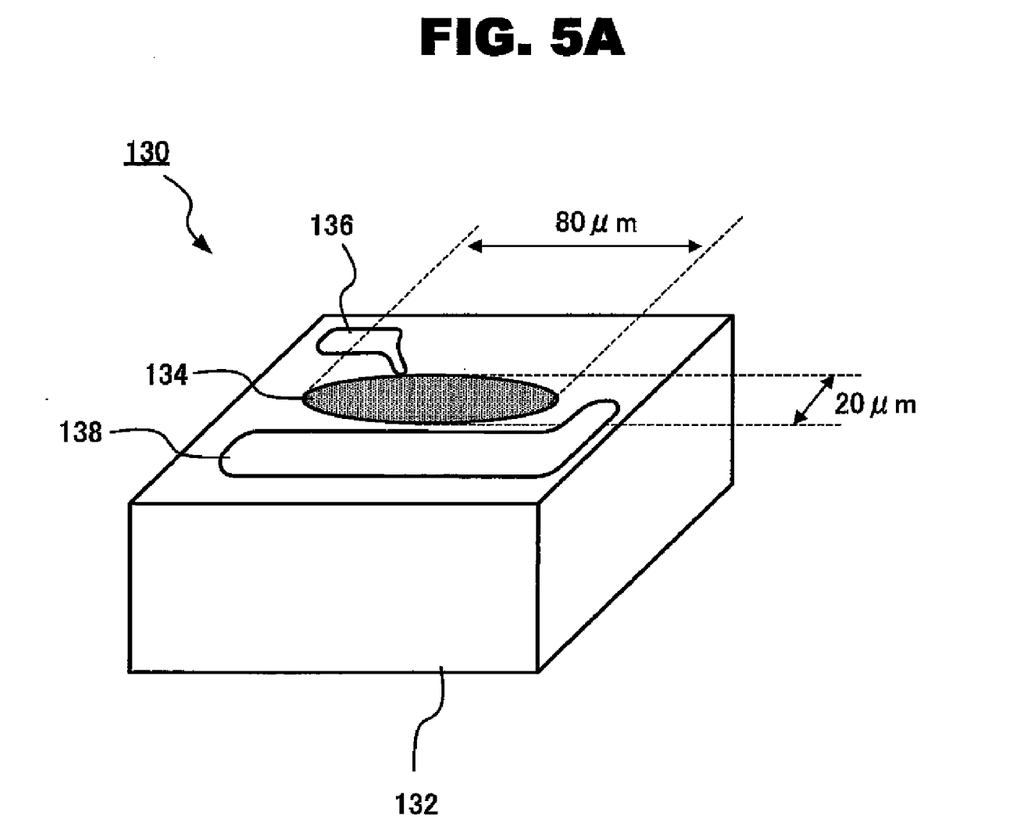
FIG. 5A is a perspective view illustrating a PD used in a bi-directional optical communication module, shown in FIG. 3.

As shown in FIG. 5A, an oval-shape of light receiving region 134, an anode electrode 136 and a cathode electrode 138 are formed on a InP substrate 132. The light receiving region 134 is shaped to have a longitudinal radius of 80 um and a shorter radius of 20 um so that the area of the light receiving region 134 is identical to a conventional round shape PD having a radius of 40 um. The longitudinal axis of the light receiving region 134 is oriented to be parallel to an optical axis (X axis) of an input light in a plane parallel to the surface of the substrate. The shape of the light receiving region 134 is not limited by oval but may be rectangular or other shapes.

Figure 5B:
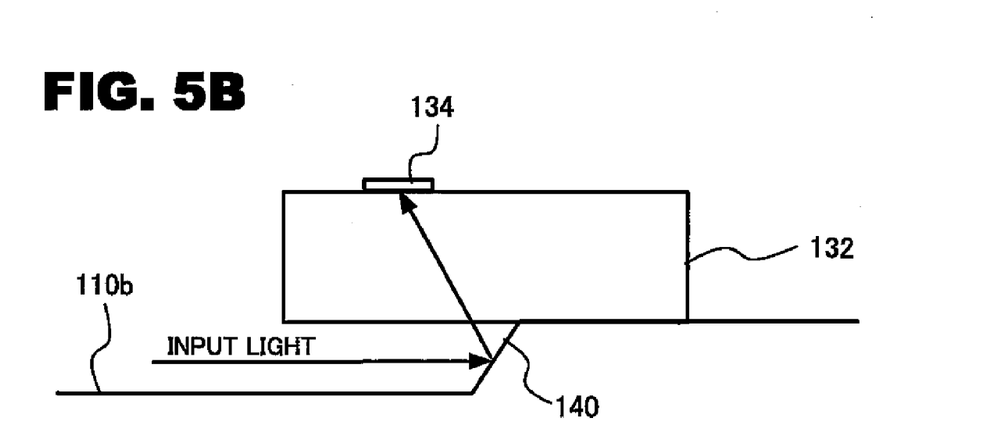
FIG. 5B is a cross-sectional view illustrating a PD used in a bi-directional optical communication module, shown in FIG. 3.

As shown in FIG. 5B, an input light is reflected at an end surface 140 of the V-shaped groove 110b, which is formed on the silicon substrate 110, so that the input light passes through the substrate 132 of the PD and reaches the light receiving region 134, formed on an upper surface of the substrate 132. The lens element 140b focus the input light IN and orients the transmitting direction of the input light IN downwardly so that the input light IN is reflected at the end surface 140 of the V-shaped groove 110b. A reflecting layer is formed, for example Au (gold) is deposited, on the end surface of the V-shaped groove 110b. The input light IN reflected at the end surface 140 is guided (oriented) upwardly toward the PD 130.

Next, fabrication steps of the optical communication module 100 will be described. First, a substrate 110 and lens elements 140a and 140b are prepared. A LD 120, PD 130 and a wavelength branching filter 150 are also prepared. In fabrication of the wavelength branching filter, a bottom surface which is to be in contact with the substrate 110 is accurately formed by a dicing process to have accuracy difference of not higher than 0.5 degrees.

Next, V-shaped grooves 110a and 110b are formed on the substrate by an etching process so that inclined surfaces of the grooves correspond to (111) surface (phase) of silicon. The V-shaped groove 110a has a V-angle of 54.7 degrees. If necessary, rectangle groove 110c and stepped (high-floor) region 110e may be formed in the same etching process as the V-shaped grooves 110a and 110b.

When a single-crystal silicon is soaked in a KOH solution, (111) surface (phase) would be selectively etched to form a V-shaped groove. By controlling such an etching time, a width of a V-shaped groove can be controlled accurately. According to the present embodiment, the WDM filter is mounted on the stepped (high-floor) region 110e, which corresponds to a bottom surface of an inverse trapezium having a accuracy difference of not higher than 0.1 degrees.

Next, relative location of the LD 120 and lens element 140a, and relative location of the PD 130 and lens element 140b are calculated. Appropriate locations of the lens elements 140a and 140b can be calculated accurately in accordance with the shape of the V-shaped groove 110a and the shape of the lens elements 140a and 140b.

Next, based on the above described calculation results of relative locations of the LD 120 and the lens element 140a, the lens element 140a is designed to have an appropriate optical axis. In the same manner, based on the above described calculation results of relative locations of the PD 130 and the lens element 140b, the lens element 140b is designed to have an appropriate optical axis.

Lens portions (regions) are formed on the lens elements 140a and 140b, in which each lens portion is formed as a diffraction optical element having a diameter of 110 um. Such a diffraction optical element is formed by an etching process using a mask. The lens elements 140a and 140b may be fabricated by a deep-etching process using a photo-mask.

According to the present embodiment, since the lens elements 140a and 140b are of micro-lenses made of silicon, lens elements can be fabricated accurately and mass production can be realized. Further, micro-lenses are small in size as compared with conventional types of lens, for example, ball lens.

Next, the wavelength branching filter 150, lens elements 140a and 140b, LD 120 and PD 130 are mounted on the substrate. Those elements can be mounted by an automatic mounting apparatus. According to the present embodiment, alignment of optical axis can be carried out simply.

In such a mounting process, the LD 120 and PD 130 are aligned on the substrate 110 using markers, and then are fixed using a solder.

Next, the lens elements 140a and 140b are aligned in optical axis on the substrate 110 using markers, and then, are fixed in the V-shaped grooves 110a and 110b using a thermosetting resin, UV-setting resin or a solder.

Mounting (alignment) accuracy of the LD 120, PD 130 and lens elements 140a and 140b depends on accuracy of a bonder, so that a margin of error would be plus/minus 3 um. On the other hand, alignment accuracy of optical axis of the lens elements 140a and 140b in a vertical direction would only have a margin of error of plus/minus 1 um. In other words, the lens elements 140a and 140b are aligned easily in a vertical direction by positioning them in the V-shaped grooves 110a and 110b. The optical axis of the lens elements 140a and 140b, which corresponds to the center of the lens portion 142, is well aligned to the LD 120 and PD 130. The lens elements 140a and 140b can be aligned with a margin of error of plus/minus 1 um, which depends on machining accuracy of the V-shaped grooves 110a and 110b and machining accuracy of contact portions of the lens elements 140a and 140b, being in contact with inner surface of the V-shaped grooves 110a and 110b.

After that, the wavelength branching filter 150 is positioned on the stepped region 110e of the substrate 110, and is fixed there using a thermosetting resin or UV-setting resin.

As described above, a margin of error of flatness accuracy of the stepped region 110e of the substrate 110 is not larger than 0.1 degrees. On the other hand, a margin of error of flatness accuracy of the bottom surface of the wavelength branching filter 150 is not larger than 0.5 degrees. Namely, according to the present embodiment, a margin of error in a vertical direction is 0.6 degrees maximum. The wavelength branching filter 150 may be moved in theta (θ) direction by plus/minus few degrees in a mounting process due to friction with the substrate 110 or the like. According to the present embodiment, since the focusing diameter (converging diameter) of the light receiving portion 134 is about 10 um, a focusing point would be shifted by about 20 um if the wavelength branching filter 150 is mounted with an alignment error of 1 degree. That is, a focusing point would be shifted 12 um in Y direction and 60 um in X direction (three degrees). The present invention is applied to the above described actual situation.

Conventionally, if a WDM filter is mounted with a rotational accuracy with a margin of error not lower than 0.5 degrees, a light receiving efficiency of an optical module using a PD is not higher than 70%. On the other hand, according to the present embodiment, a light receiving efficiency of an optical module is not deteriorated until a rotational accuracy with a margin of error of a WDM filter is plus/minus 1 degree. Namely, a tolerance of alignment error of a WDM filter 150 in theta (θ) direction was remarkably increased. As a result, a production yield of the optical transmission module is increased.

Further, according to the present embodiment, light receiving efficiency of a PD can be improved without deterioration of a receiving sensitivity of the PD.

Second Preferred Embodiment

Figure 6:
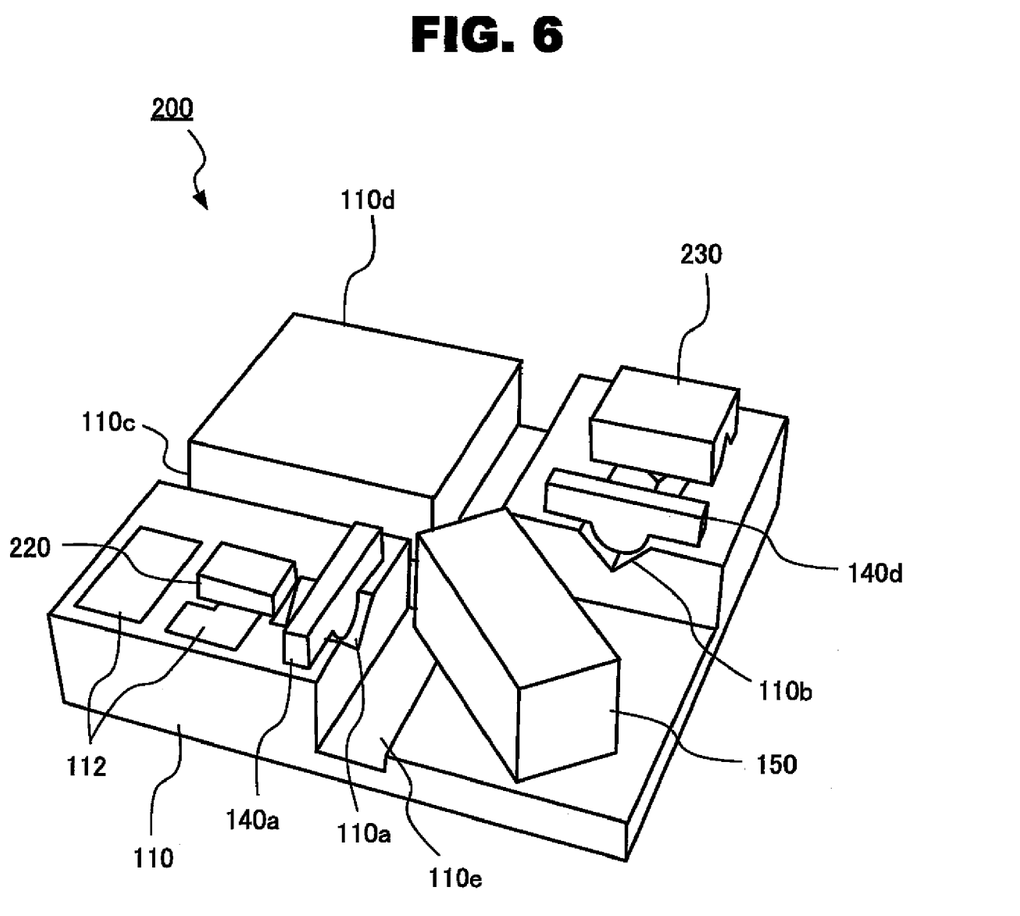
FIG. 6 is a perspective view illustrating a bi-directional optical communication module according to a second preferred embodiment of the present invention.
Figure 7A:
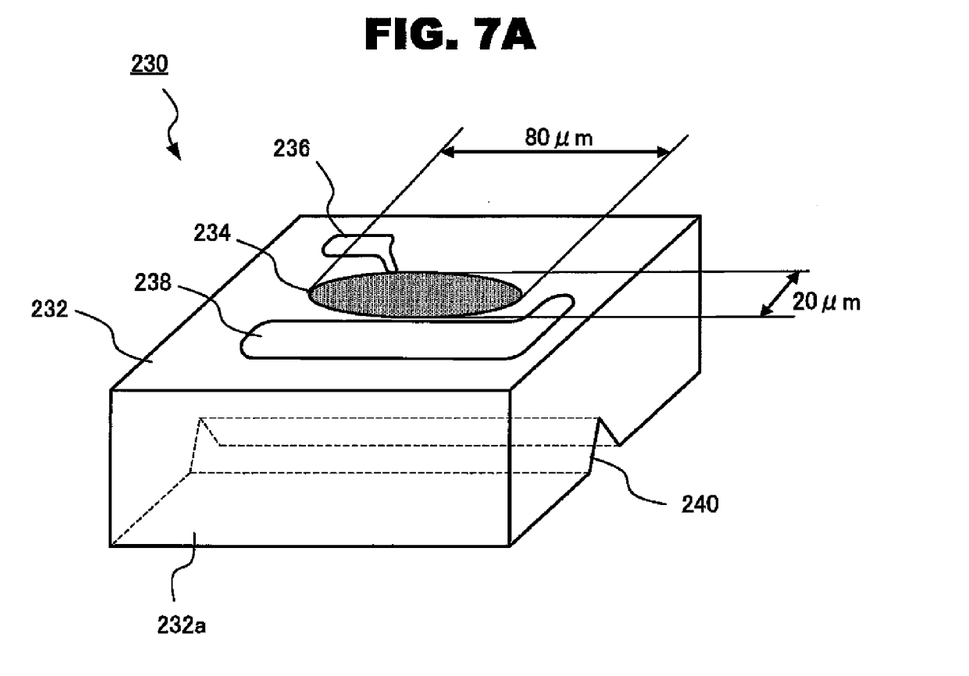
FIG. 7A is a perspective view illustrating a PD used in a bi-directional optical communication module, shown in FIG. 6.
Figure 7B:
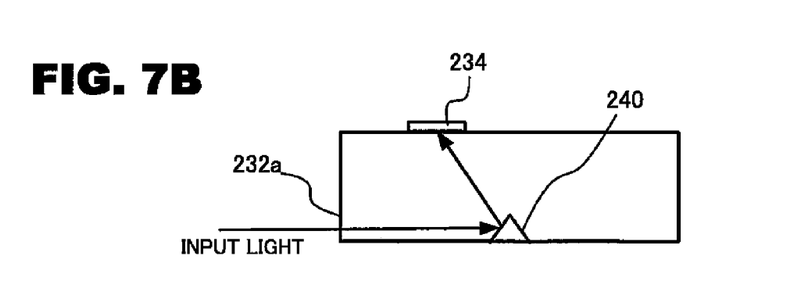
FIG. 7B is a cross-sectional view illustrating a PD used in a bi-directional optical communication module, shown in FIG. 6.

A second preferred embodiment of the present invention is now described, in which the difference from the first preferred embodiment is mainly described. FIG. 6 is a perspective view illustrating a bi-directional optical communication module according to a second preferred embodiment of the present invention. FIG. 7A is a perspective view illustrating a PD used in a bi-directional optical communication module, shown in FIG. 6. FIG. 7B is a cross-sectional view illustrating a PD used in a bi-directional optical communication module, shown in FIG. 6.

An optical module 200 according to the present embodiment, a substrate 110 having V-shaped grooves 110a and 110b is prepared. On the substrate 110, a laser diode (LD) 120 functioning as a light emitting device, a photodiode (PD) 230 functioning as a light receiving device, lens elements 140a and 140b, and a wavelength branching filter (WDM filter) 150 are mounted.

The PD 230 is a light receiving element and is shaped to be a rectangular solid having a thickness of about 150 um. The PD 230 is arranged adjacent the V-shaped groove 110b to receive an input light transmitted via the wavelength branching filter 150 and lens element 140b. The PD 230 may be made of InGaAs or Ge (germanium) by a conventional process, which has been widely used. For example, the PD 130 may be of a PIN photodiode having an InGaAs layer formed on an InP substrate.

As shown in FIG. 7A, an oval-shape of light receiving region 234, an anode electrode 236 and a cathode electrode 238 are formed on an InP substrate 232. The light receiving region 234 is shaped to have a longitudinal radius of 80 um and a shorter radius of 20 um so that the area of the light receiving region 234 is identical to a conventional round shape PD having a radius of 40 um. The longitudinal axis of the light receiving region 234 is oriented to be parallel to an optical axis (X axis) of an input light in a plane parallel to the surface of the substrate. The shape of the light receiving region 234 is not limited by oval but may be rectangular or other shapes. The light receiving region 234 may be formed to have a ratio of 4:1 (four to one) between the longitudinal axis and a shorter axis, which can be modified.

As shown in FIGS. 6 and 7B, an input light is supplied via the wavelength branching filter 150 and the lens element 140b to the PD 230, which is of an end-surface receiving type. The PD 230 is provided with a reflecting surface 240, which may be formed by forming an inverse-V shape groove on a bottom of the InP substrate 232. A light supplied to an end surface 232a of the PD 230, is reflected at the reflecting surface 240 and is guided to the light receiving region 234.

The optical communication module 200 can be fabricated by the same process as the first preferred embodiment.

According to the present invention, a tolerance of alignment error of a WDM filter 150 in theta (θ) direction was remarkably increased. As a result, a production yield of the optical transmission module is increased. Further, according to the present embodiment, light receiving efficiency of a PD can be improved without deterioration of a receiving sensitivity of the PD.

What is claimed is:

1. A bi-directional optical communication module, comprising:
   a base substrate;
   a wavelength branching filter arranged on the base substrate, in which a light is allowed to go through or be reflected according to a wavelength thereof;
   a photodetector arranged on the base substrate to receive a light passed through the wavelength branching filter and to convert the light into an electric signal; and
   a light emitting device arranged on the base substrate to provide a transmission light, wherein
   the transmission light is outputted through the wavelength branching filter,
   the optical detector comprises a light receiving portion which is formed to have a first length and a second length, which is shorter than the first length,
   the first length of the light receiving portion is perpendicular to an optical axis of an input light on a plane parallel to a surface of the substrate, and a second length of the light receiving portion is parallel to the optical axis of the input light.

2. A bi-directional optical communication module according to claim 1, wherein
   the light receiving portion is shaped to be ellipse in plane view.

3. A bi-directional optical communication module according to claim 1, wherein
   the optical detector further comprises a substrate (for optical detector), which has an upper surface on which the light receiving portion is formed and a lower surface so that an input light enters from the lower surface, passes through the substrate and reaches to the light receiving portion.

4. A bi-directional optical communication module according to claim 3, wherein
   the optical detector is of an end face entrance type having an inclined portion on a bottom surface so that an input light is reflected at the inclined portion and reaches to the light receiving portion.

5. A bi-directional optical communication module according to claim 3, wherein
the base substrate is provided with a V-shaped groove through which a light reflected by the wavelength branching filter is guided to the photodetector, an inclined surface is formed at an end surface of the V-shaped groove so that a light reflected at the inclined surface reaches to the light receiving portion.

* * * * *